(12) United States Patent
Katoh et al.

(10) Patent No.: US 6,442,984 B1
(45) Date of Patent: Sep. 3, 2002

(54) SECURITY SYSTEM IN AN EXTEND UNIT FOR A COMPUTER

(75) Inventors: Katsutoshi Katoh, Tokyo-to; Tetsuya Ohtani, Yokohama; Shigeru Ishii, Machida; Yoshiharu Uchiyama, Isehara, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,753

(22) Filed: Apr. 11, 2000

(30) Foreign Application Priority Data

Apr. 16, 1999 (JP) ............................................. 11-109027

(51) Int. Cl.$^7$ ................................................ E05B 69/00
(52) U.S. Cl. ........................... 70/58; 248/553; 361/686
(58) Field of Search ................................ 70/14, 18, 57, 70/58; 248/551–553; 361/686, 732, 740, 759, 683, 684, 726, 747

(56) References Cited

U.S. PATENT DOCUMENTS

| | | | | |
|---|---|---|---|---|
| 5,787,737 A | * | 8/1998 | Cho | 70/58 |
| 5,787,738 A | * | 8/1998 | Brandt et al. | 70/58 |
| 5,791,171 A | * | 8/1998 | Kelley | 70/58 |
| 5,870,283 A | * | 2/1999 | Maeda et al. | 361/686 |
| 5,960,651 A | * | 10/1999 | Tanisawa | 70/58 X |
| 5,983,679 A | * | 11/1999 | Reyes | 70/58 |
| 5,987,937 A | * | 11/1999 | Lee | 70/58 X |
| 5,995,366 A | * | 11/1999 | Howell et al. | 70/57 X |
| 6,000,251 A | * | 12/1999 | Murray, Jr. et al. | 70/58 |
| 6,006,557 A | * | 12/1999 | Carl et al. | 70/58 |
| 6,038,891 A | * | 3/2000 | Zeren et al. | 70/58 |
| 6,047,572 A | * | 4/2000 | Bliven et al. | 361/686 X |
| 6,061,233 A | * | 5/2000 | Jung | 361/686 |
| 6,170,304 B1 | * | 1/2001 | Ohta | 70/58 X |
| 6,175,491 B1 | * | 1/2001 | Park | 361/686 |
| 6,182,481 B1 | * | 2/2001 | Nagy | 70/58 |

* cited by examiner

*Primary Examiner*—Suzanne Dino Barrett
(74) *Attorney, Agent, or Firm*—Bracewell & Patterson, L.L.P.; J. Bruce Schelkopf

(57) ABSTRACT

Described is a security mechanism effective in various combinations of a notebook PC and various extend units. An extend unit includes a security slot for attaching a cable lock, a security select which has a plurality of select positions and the select position of which is fixed when the cable lock is attached to the security slot. A linking unit is included for interlocking with the security select switch, disabling a release switch to be operated with fixing the release switch of a subsystem holding bay when the security select switch is positioned at a first select position, disabling the release switch and an eject switch, separating the notebook PC from the extend unit, to be operated when the security select switch is positioned at a second select position, and enabling the release switch and eject switch to be operated without fixing the release switch and eject switch when the security select switch is positioned at a third select position.

9 Claims, 4 Drawing Sheets

SECURITY SYSTEM IN AN EXTEND UNIT FOR A COMPUTER

BACKGROUND OF THE INVENTION

1. Field of the Invention

The present invention relates to a security system in an extend unit being used with a computer in one body and extending functions of the computer.

2. Description of Related Art

Recently, various types of small personal computers have been developed. Each of which has, for example, an LCD unit and a hard disk drive that can be battery-driven and easily carried. They are generally called a laptop PC or a notebook PC (hereinafter, referred to as a notebook PC).

Such a notebook PC has a body whose functions are limited. An extend unit can be connected to the body of the notebook PC as necessary and is provided with a variety of drives such as a floppy disk drive and a CD-ROM drive, and input/output ports so as to further reduce its weight and to increase its portability. There are various types of extend units such as a unit having bays for holding subsystems such as various types of drive apparatuses described above, a second battery, and a second hard disk drive, and input/output ports, a unit designed in consideration of carrying the unit with connecting the unit to a notebook PC, and a unit that can be connected to another extend unit in one body.

A notebook PC is very susceptible to being stolen due to its light weight. As a means of preventing burglaries, cable locks are widely used. The cable locks are called a Micro-Saver® security system and are sold by Kensington Corporation in California, USA. This cable lock prevents a burglary by wrapping its cable around a leg of a table, a desk, or the like, inserting the lock portion into the security slots, provided in a computer or the like, and locking the computer or the like. In most notebook PCs on the market, such a security slot is provided, and it also becomes common to provide a security slot in such an extend unit described above.

In the case when a user uses a notebook PC and an extend unit combined, the user should consider the security in the various states that corresponds to the user's object. For example, although such a cable lock that is described above can be used for the protection of only a notebook PC or only an extend unit, conventionally, respective cable locks should be attached to the notebook PC and extend unit so as to protect both of them.

In addition, usually since subsystems such as various types of drive apparatuses and a battery that are held in bays of an extend unit are easily detached, there is a probability of the subsystems being stolen even if only the extend unit is protected with the cable lock.

Since it is also supposed that an ordinary PC is driven by only a battery, it is not adequate to use electric means such as a solenoid, and further the means should be small and light in weight. Nevertheless, a security system that fulfills such conditions does not exist.

In consideration of the problems described above, an object of the present invention is to provide a security system effective in various combinations of a notebook PC and various types of extend units.

SUMMARY OF THE INVENTION

A security system in an extend unit according to the present invention includes fixing means for fixing a computer at a predetermined location, an eject switch for detaching the computer and separating the computer from the extend unit and a security slot for attaching a cable lock. The system also includes a security select switch which has a plurality of select positions and is fixed when the cable lock is attached to the security slot. Linking means are provided for interlocking with the security select switch, disabling the eject switch to be operated with fixing the eject switch if the security select switch is positioned at a first select position, and enabling the eject switch to be operated without fixing the eject switch if the security select switch is positioned at a second select position.

In accordance with the present invention, when a notebook PC and an extend unit thereof are left unattended, they can be protected by connecting the notebook PC to the extend unit, positioning the security select switch of the extend unit at a predetermined select position and locking the cable lock to the security slot.

The security system according to another embodiment of the present invention includes a bay for holding and fixing a subsystem, a release switch for releasing the fixing of the subsystem held in the bay and separating the subsystem from the extend unit. The system also includes a security slot for attaching a cable lock, a security select switch which has a plurality of select positions and the select position of which is fixed when the cable lock is attached to the security slot. Linking means are provided for interlocking with the security select switch, disabling the release positioned at a first select position and enabling the release switch to be operated without fixing the release switch if the security select switch is positioned at a second select position.

In accordance with this embodiment of the present invention, when only a notebook PC is carried and only an extend unit having a bay for a subsystem is left, not only can the extend unit be protected but also a subsystem held in the bay of this extend unit just by positioning a security select switch of the extend unit at a predetermined select position and locking a cable lock to a security slot.

A security system in an extend unit according to another embodiment of the present invention includes fixing means for fixing a computer at a predetermined location, an eject switch for releasing the fixing of the computer and separating the computer from the extend unit, a bay for holding and fixing a subsystem and a release switch for releasing the fixing of the subsystem held in the bay and separating the subsystem from the extend unit. The system also includes a security slot for attaching a cable lock, a security select switch which has a plurality of select positions and is fixed when the cable lock is attached to the security slot. Linking means are provided for interlocking with the security select switch, disabling the release switch to be operated with fixing the release switch if the security select switch is positioned at a first select position, disabling the release switch and eject switch to be operated with fixing the release switch and eject switch if the security select switch is positioned at a second select position, and enabling the release switch and eject switch to be operated without fixing the release switch and eject switch if the security select switch is positioned at a third select position.

According to this embodiment of the present invention, in only a notebook PC, only an extend unit, and all the combinations of the notebook PC and extend unit, it is possible to protect the notebook PC, extend unit, and subsystem held in the extend unit just by attaching a cable lock.

DETAILED DESCRIPTION OF THE INVENTION

Figure 1:
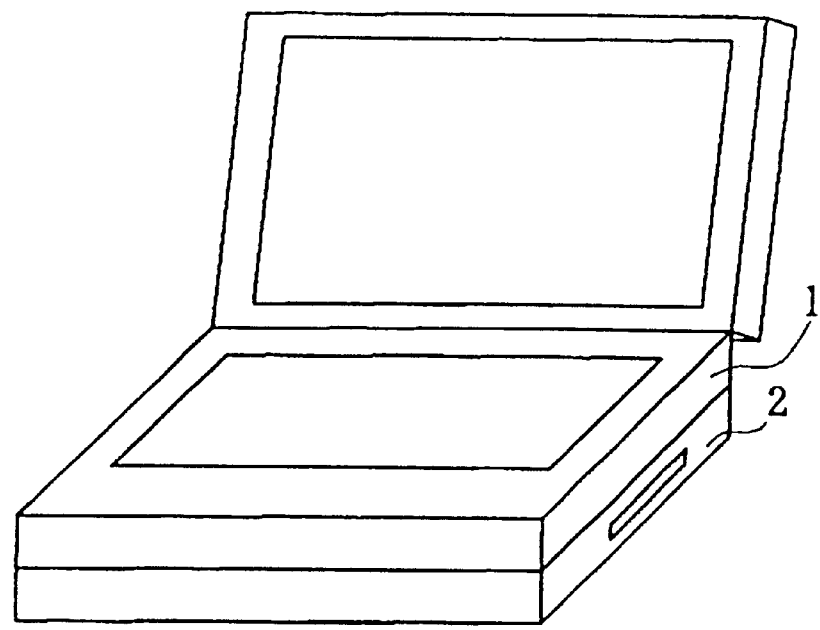
FIG. 1 is a perspective view showing the configuration of a system comprising a notebook PC and an extend unit.

First, a system configured by an extend unit according to an embodiment of the present invention and a notebook PC combined with the extend unit will be described. FIG. 1 is a perspective view showing the configuration of such a system. A notebook PC 1 comprises a display unit such as an LCD, a keyboard, a pointing device, a first battery, and a first hard disk drive, and can be also used alone. A first extend unit 2 is connected to this notebook PC 1 in one piece if necessary, and extends functions of the notebook PC 1.

Figure 2:
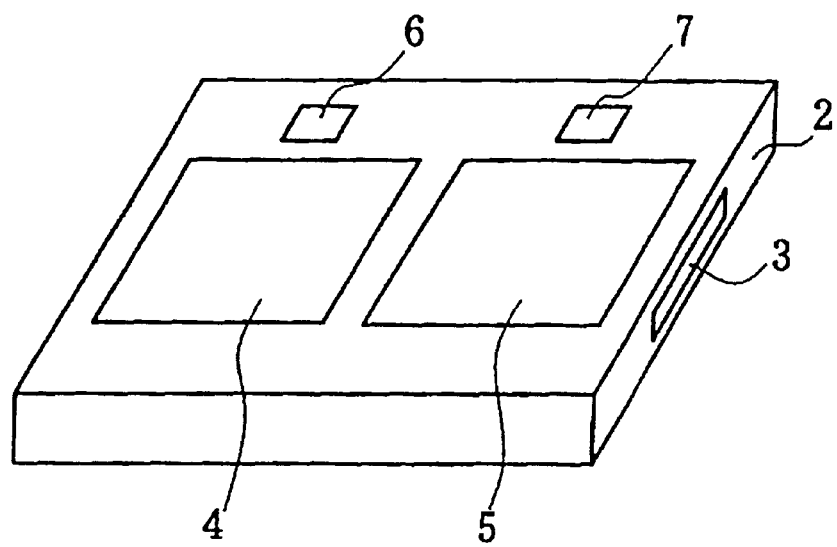
FIG. 2 is a perspective view showing the extend unit in further detail.

FIG. 2 is a perspective view showing the first extend unit 2 in further detail. The first extend unit 2 comprises a fixing mechanism for fixing the connection to the notebook PC 1, and an eject lever 3 for releasing the fixing. Preferably, one or two eject levers 3 are provided in a side of the first extend unit 2. The first extend unit 2 selectively has input/output ports in conformity with various standards such as USB, SCSI, and IEEE-1394 or the like. Furthermore, the first extend unit 2 has bays 4 and 5 that can hold and fix subsystems such as floppy disk drive (FDD), a CD-ROM drive, a DVD drive, a second hard disk drive (HDD), and a second battery if needed. Release buttons 6 and 7 for respective bays that release the fixing of subsystems held in bays 4 and 5 are provided in the first extend unit 2. Preferably, the bays 4 and 5, and the release buttons 6 and 7, are provided in the upper side of the first extend unit 2 so that the release buttons 6 and 7 cannot be accessed when the first extend unit 2 is connected to the notebook PC 1.

Figure 3:
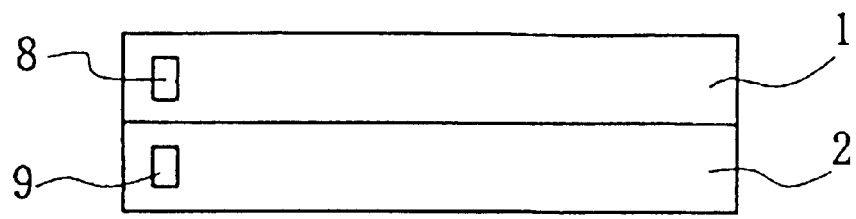
FIG. 3 is a rear view of the extend unit and notebook PC.

FIG. 3 is a rear view of the notebook PC 1 and first extend unit 2. The notebook PC and first extend unit 2 have security slots 8 and 9 for attaching cable locks, respectively. Preferably, these security slots are provided in rear surfaces of the notebook PC 1 and first extend unit 2 respectively, as shown in this drawing.

According to the intended purpose of a user using this system, it is necessary to consider security in three states: only the notebook PC 1; only the first extend unit 2; and a combination of the notebook PC 1 and first extend unit 2. In the case of only the notebook PC 1, it is sufficient to attach a cable lock to the security slots 8.

Figure 4:
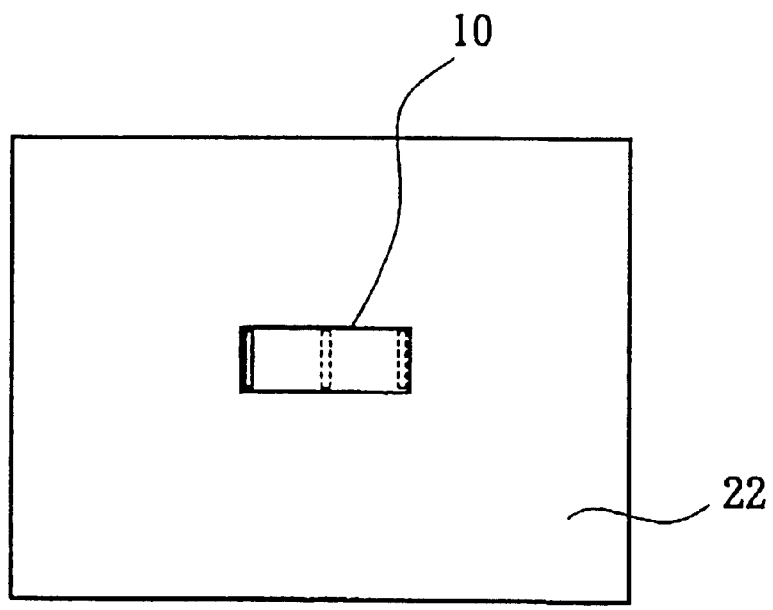
FIG. 4 is a bottom view of the extend unit.

FIG. 4 is a bottom view of the first extend unit 2. The first extend unit 2 further has a security select slide knob 10. Preferably, this slide knob 10 is provided in the bottom surface to the first extend unit 2, as shown in this drawing. This security select slide knob 10 has three select positions in this example. Of course, the number of the select positions can be two, four or more. If a cable lock is attached to the security slot 9, the slide knob 10 cannot be moved.

The following Table 1 shows the relation among the select positions of the slide knob 10, bays 4 and 5, and an eject lever of the notebook PC 1.

| Select Position | Bays | Eject Lever |
| --- | --- | --- |
| First | Free | Free |
| Second | Locked | Free |
| Third | Locked | Locked |

It is possible to take out subsystems held in the bays 4 and 5 by pressing the release buttons when the slide knob 10 is positioned at the first select position. When the slide knob 10 is positioned at the second select position, the release buttons 6 and 7 of the bays 4 and 5 are fixed, and hence cannot be moved. Therefore, it becomes impossible to take out the subsystems held in these bays. Such a mechanism interlocking with the slide knob 10 can be realized with a simple mechanical link mechanism. Therefore, so as to protect only the first extend unit 2, by positioning the slide knob 10 at the second select position and attaching the cable lock to the security slot 9, it becomes possible to protect not only the first extend unit 2 itself, but also subsystems held in bays 4 and 5.

When the slide knob 10 is positioned at the first select position, it is possible to separate the notebook PC 1 connected to the first extend unit 2 by moving the eject lever 3. When the slide knob 10 is positioned at the third select position, not only the release buttons 6 and 7 but also the eject lever are fixed, and hence it becomes impossible to separate the first extend unit 2 and notebook PC 1 to the first extend unit 2. Positioning the slide knob 10 at the third select position, and attaching the cable lock to the security slot 9, it becomes possible to protect all of the first extend unit 2 where the cable lock is attached, the subsystems that are held in the first extend unit 2 and cannot be detached, and the notebook PC 1 that is connected to the first extend unit 2 in one piece and cannot be separated.

In addition, there is also such an advantage that is possible to prevent the notebook PC 1 from suddenly being separated from the first extend unit 2 by the eject lever 3 being carelessly operated so long as the slide knob 10 is positioned at the third position when the notebook PC 1 connected to the first extend unit 2 is carried.

Figure 5:
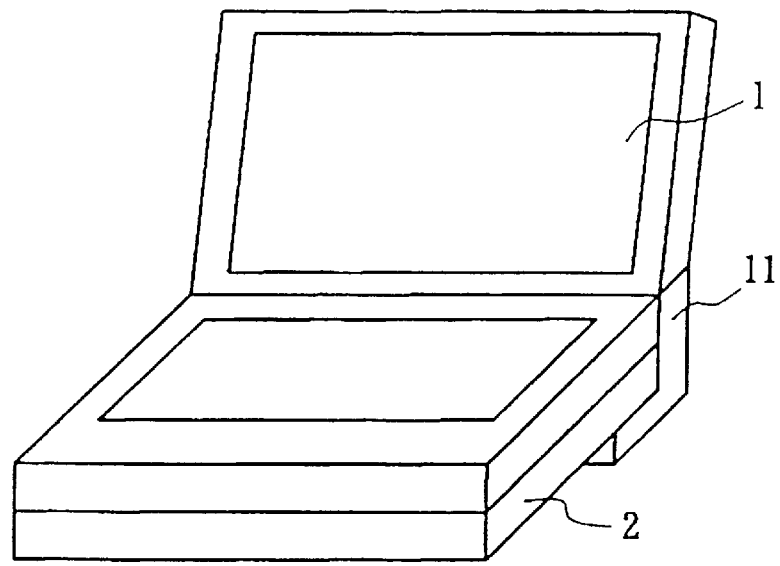
FIG. 5 is a perspective view showing the configuration of a system comprising a notebook PC, an extend unit, and another extend unit.

Next, a system further that comprises another extend unit, mounted on the extend unit in one piece, in addition to the system described above will be described. FIG. 5 is a perspective view showing the configuration of such a system. A second extend unit 11 is mounted on the first extend unit 2 in one piece, further extends functions of the notebook PC 1, and comprises, for example, other input/output ports. In this system, states not existing in the system that are configured by the notebook PC 1 and only the first extend unit 2 and is described extend unit 2 and extend unit 11; and a combination of the notebook PC 1, first extend unit 2, and second extend unit 11.

Figure 6:
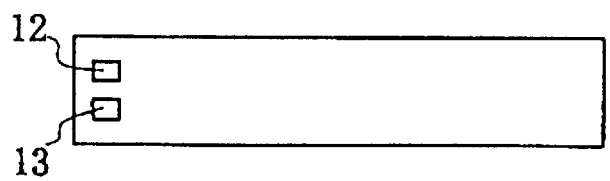
FIG. 6 is a rear view of another extend unit.

FIG. 6 is a rear view of the second extend unit 11. The second extend unit 11 comprises two security slots 12 and 13. The security slot 12 has a form similar to those of the security slots 8 and 9. In order to protect only the second extend unit 11, it is sufficient just to attach a cable lock to security slot 12.

The security slot 13 has such a form that the first extend unit 2 is connected to the second extend unit 11 and cannot be separated when a cable lock is attached. A security slot in such a form is known.

In order to protect the first extend unit 2 and second extend unit 11, these units are connected to each other, the slide knob 10 is positioned at the second or third select position, and a cable lock is attached to the security slot 13. In addition, in order to protect the notebook PC 1, first extend unit 2 and second extend unit 11, these units are connected to each other, the slide knob 10 is positioned at the third select position, and a cable lock is attached to the security slot 13. Nevertheless, in no other setting but this, it is possible to freely move the slide knob 10 because a cable lock is not attached to the security slot 9. Therefore, there is a possibility of being not able to protect the notebook PC 1 and subsystems held in bays 4 and 5.

Then, as an example, the second extend unit 11 is formed in such a shape that the slide knob 10 cannot be operated because the slide knob 10 is covered when the second extend unit 11 is mounted on the first extend unit 2 in one piece. Owing to this, it becomes impossible to move the slide knob 10 any more by positioning the slide knob 10 at the second or third select position, mounting the second extend unit 11 on the first extend unit 2, and attaching a cable lock to the security slot 13. Hence, it becomes possible to protect all of the notebook PC 1, first extend unit 2, second extend unit 11, and subsystems held in bay 4 and 5.

In addition, in another example, a dummy lock is used, the dummy lock which disables the slide knob 10 to move similarly as a case that a cable lock is attached if the dummy lock is attached to the security slot 9. In this case, the second extend unit 11 is formed in such a shape that the security slot 9 where the dummy lock is attached is covered when the second extend unit 11 is mounted on the first extend unit 2 in one piece. Further in this case, it becomes impossible to detach the dummy lock any more by positioning the slide knob 10 at the second or third select position, attaching the dummy lock to the security slot 9, thereafter mounting the second extend unit 11 on the first extend unit 2, and attaching a cable lock to the security slot 13. Hence, since it becomes impossible to move the slide knob 10, it becomes possible to protect all of the notebook PC 1, first extend unit 2, second extend unit 11, and subsystems held in the bays 4 and 5.

Figure 7:
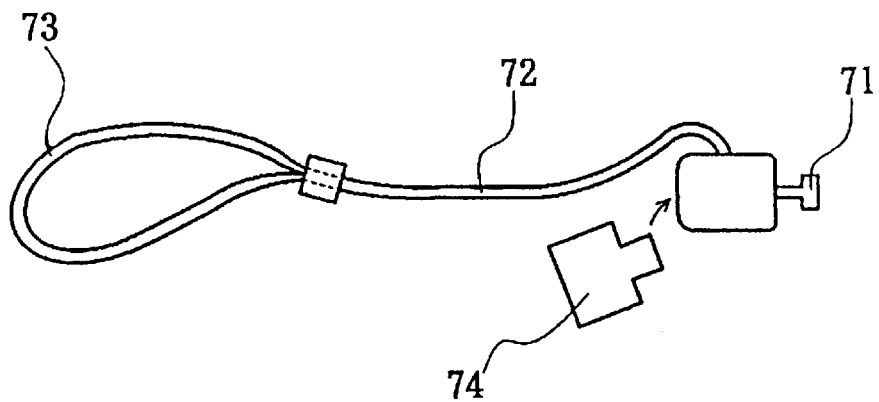
FIG. 7 is a schematic diagram showing a cable lock.

FIG. 7 is a schematic diagram showing an example of a cable lock used in the present invention. This cable lock comprises an attaching portion 71 attached to the security slot, a cable portion 72 configured by a metal cable, and an annular portion 73 that is made by looping this cable and fixing the loop. In the case when this cable lock is attached to a notebook PC or the like, the notebook PC or the like is locked by wrapping the cable portion 72 around a leg of a table or a desk, passing the cable portion 72 through the annular portion 73, inserting an insert portion of the attaching portion 71 into the security slot, inserting a key 74 into a keyhole of the attaching portion 71, and turning the key to a predetermined position.

Figure 8:
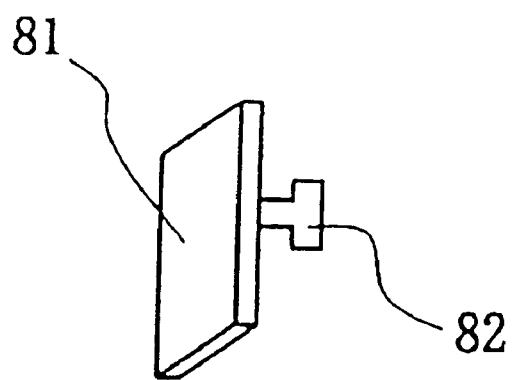
FIG. 8 is a schematic diagram showing a dummy lock.

FIG. 8 is a schematic diagram showing an example of the dummy lock. An insert portion 82 of this dummy lock corresponds to the attaching portion 71 of the cable lock shown in FIG. 7. This dummy lock comprises a plate portion 81 and an insert portion 82. It is advantageous to form a portion except the insert portion 82 in a shape like the plate portion 81 in this example, because the former portion is out of the way when the second extend unit 11 is mounted on the first extend unit 2. This dummy lock is attached by inserting the insert portion 82 into the security slot and sliding the dummy lock. As described above, if this dummy lock is attached to the security slot 9 of the first extend unit 2, the slide knob 10 cannot be moved similarly to a case that a cable lock is attached.

Thus, the invention provides a security system in an extend unit that is connected to a computer in one piece and extends functions of the computer. The security system comprises: (1) fixing means for fixing the computer at a predetermined location; (2) an eject switch for releasing fixing of the computer and separating the computer from the extend unit; (3) a security slot for attaching a cable lock; (4) a security select switch which has a plurality of select positions, the select position of which is fixed when the cable lock is attached to the security slot; and (5) linking means for interlocking with the security select switch, disabling the eject switch to be operated with fixing the eject switch if the security select switch is positioned at a first select position and enabling the eject switch to be operated without fixing the eject switch if the security select switch is positioned at a second select position.

In another embodiment, the security system also comprises: (6) a second extend unit that is connected to the extend unit in one piece and extends functions of the computer. The second extend unit comprises a first security slot for attaching a cable lock, and a second security unit for disabling the extend unit, being connected to the second extend unit, to be separated when the cable lock is attached. Also, the second extend unit is formed in such a shape that the security select switch cannot be operated due to covering of the security select switch when the second extend unit is connected to the extend unit.

In another embodiment, the security system further comprises: (6) a second extend unit that is connected to the extend unit in one piece and extends functions of the computer and a dummy lock disabling a slide knob to move similarly to a case that a cable lock is attached to when the dummy lock is attached to the security slot. The second extend unit comprises a first security slot for attaching a cable lock and a second security unit for disabling the extend unit connected to the second extend unit to be separated when the cable lock is attached. Also, the second extend unit is formed in such a shape that the dummy lock cannot be detached due to covering of the security slot of the extend unit to which the dummy lock is attached, when the second extend unit is connected to the extend unit.

While the invention has particularly shown and described with respect to preferred embodiments thereof, it should be understood by those skilled in the art that the foregoing and other changes in form and detail may be made therein without departing from the spirit and scope of the invention as defined in the appended claims.

What is claimed:

1. A security system in an extend unit that is connected to a computer in one piece and extends functions of the computer, comprising:

fixing means for fixing the computer at a predetermined location;

an eject switch for releasing fixing of the computer and separating the computer from the extend unit;

a security slot for attaching a cable lock;

a security select switch which has a plurality of select positions, a select position of which is fixed when the cable lock is attached to the security slot; and linking means for interlocking with the security select switch, disabling the eject switch to be operated by fixing the eject switch if the security select switch is positioned at a first select position, and enabling the eject switch to be operated without fixing the eject switch if the security select switch is positioned at a second select position.

2. The security system in an extend unit according to claim 1, further comprising:

a second extend unit that is connected to the extend unit in one piece and extends functions of the computer, wherein the second extend unit comprises a first security slot for attaching a cable lock and a second security unit for disabling the extend unit connected to the second extend unit, to be separated when the cable lock is attached, and wherein the second extend unit is formed in such a shape that the security select switch cannot be operated due to covering of the security select switch when the second extend unit is connected to the extend unit.

3. The security system in an extend unit according to claim 1, further comprising:

a second extend unit that is connected to the extend unit in one piece and extends functions of the computer; and a dummy lock disabling a slide knob to move similarly to a case that a cable lock is attached to when the dummy lock is attached to the security slot;

wherein the second extend unit comprises a first security slot for attaching a cable lock, and a second security unit for disabling the extend unit connected to the second extend unit to be separated when the cable lock is attached, and wherein the second extend unit is formed in such a shape that the dummy lock cannot be detached due to covering of the security slot of the extend unit, to which the dummy lock is attached when the second extend unit is connected to the extend unit.

4. A security system in an extend unit that is connected to a computer in one piece and extends functions of the computer, comprising:

a bay for holding and fixing a subsystem;

a release switch for releasing of the subsystem held in the bay and separating the subsystem from the extend unit;

a security slot for attaching a cable lock;

a security select switch which has a plurality of select positions, a select position of which is fixed when the cable lock is attached to the security slot; and linking means for interlocking with the security select switch, disabling the release switch to be operated by fixing the release switch if the security select switch is positioned at a first select position, and enabling the release switch to be operated without fixing the release switch if the security select switch is positioned at a second select position.

5. The security system in an extend unit according to claim 4, further comprising:

a second extend unit that is connected to the extend unit in one piece and extends functions of the computer, wherein the second extend unit comprises a first security slot for attaching a cable lock, and a second security unit for disabling the extend unit connected to the second extend unit, to be separated when the cable lock is attached, and wherein the second extend unit is formed in such a shape that the security select switch cannot be operated due to covering of the security select switch when the second extend unit is connected to the extend unit.

6. The security system in an extend unit according to claim 4, further comprising:

a second extend unit that is connected to the extend unit in one piece and extends functions of the computer; and a dummy lock disabling a slide knob to move similarly to a case that a cable lock is attached to when the dummy lock is attached to the security slot;

wherein the second extend unit comprises a first security slot for attaching a cable lock, and a second security unit for disabling the extend unit connected to the second extend unit to be separated when the cable lock is attached, and wherein the second extend unit is formed in such a shape that the dummy lock cannot be detached due to covering of the security slot of the extend unit, to which the dummy lock is attached when the second extend unit is connected to the extend unit.

7. A security system in an extend unit that is connected to a computer in one piece and extends functions of the computer, comprising:

fixing means for fixing the computer at a predetermined location;

an eject switch for releasing the computer and separating the computer from the extend unit;

a bay for holding and fixing a subsystem;

a release switch for releasing a subsystem held in the bay and separating the subsystem from the extend unit;

a security slot for attaching a cable lock;

a security select switch which has a plurality of select positions, a select position of which is fixed when the cable lock is attached to the security slot; and linking means for interlocking with the security select switch, disabling the release switch to be operated by fixing the release switch if the security select switch is positioned at a first select position, disabling the release switch and eject switch to be operated by fixing the release switch and eject switch if the security select switch is positioned at a second select position, and enabling the release switch and eject switch to be operated without fixing the release switch and eject switch if the security select switch is positioned at a third select position.

8. The security system in an extend unit according to claim 7, further comprising:

a second extend unit that is connected to the extend unit in one piece and extends functions of the computer, wherein the second extend unit comprises a first security slot for attaching a cable lock, and a second security unit for disabling the extend unit connected to the second extend unit to be separated when the cable lock is attached, and wherein the second extend unit is formed in such a shape that the security select switch cannot be operated due to covering of the security select switch when the second extend unit is connected to the extend unit.

9. The security system in an extend unit according to claim 7, further comprising:

a second extend unit that is connected to the extend unit in one piece and extends functions of the computer; and a dummy lock disabling a slide knob to move similarly to a case that a cable lock is attached to when the dummy lock is attached to the security slot;

wherein the second extend unit comprises a first security slot for attaching a cable lock and a second security unit for disabling the extend unit connected to the second extend unit to be separated when the cable lock is attached, and wherein the second extend unit is formed in such a shape that the dummy lock cannot be detached due to covering of the security slot of the extend unit, to which the dummy lock is attached, when the second extend unit is connected to the extend unit.

\* \* \* \* \*